United States Patent [19]
Kimura et al.

[11] Patent Number: 5,392,362
[45] Date of Patent: Feb. 21, 1995

[54] IMAGE CODING DEVICE AND DECODING DEVICE

[75] Inventors: Shunichi Kimura; Yutaka Koshi; Koh Kamizawa, all of Ebina, Japan

[73] Assignee: Fuji Xerox Co., Ltd., Tokyo, Japan

[21] Appl. No.: 137,798

[22] Filed: Oct. 19, 1993

[30] Foreign Application Priority Data

Nov. 13, 1992 [JP] Japan .................................. 4-304095

[51] Int. Cl.$^6$ .............................................. G06K 9/00
[52] U.S. Cl. .......................................... 382/9; 382/56; 358/464
[58] Field of Search ............... 382/56, 9, 50; 358/462, 358/464

[56] References Cited

U.S. PATENT DOCUMENTS

| | | | |
|---|---|---|---|
| 4,750,209 | 6/1988 | Shimura et al. | 382/9 |
| 4,856,075 | 8/1989 | Smith | 382/9 |
| 5,073,953 | 12/1991 | Westdijk | 382/9 |
| 5,109,436 | 4/1992 | Machida et al. | 382/9 |

FOREIGN PATENT DOCUMENTS 0096219  12/1983  European Pat. Off. ............ 358/430

OTHER PUBLICATIONS

Keith Gunn, "Compression of Images" workshop presented at Nat. Conf. & Expo on Electronic Imaging '90, Feb. 20–22, 1990. Wash., D.C. pp. 1–6 & D1–6.
Efficient Hybrid Coding Scheme for Color Facsimile, Katsuno et al., Electronic Information Communication Society Technical Report CS 91–96, 1991, pp. 13–20.

*Primary Examiner*—Leo H. Boudreau
*Attorney, Agent, or Firm*—Finnegan, Henderson, Farabow, Garrett & Dunner

[57] ABSTRACT

An image coding device including a dividing circuit for dividing an input image signal into a plurality of image areas, a coding method deciding circuit for deciding a coding method for a target one of the image areas, a binary image coder for coding a binary image in the target image area to obtain a binary image code, a nonbinary image coder for coding a nonbinary image in the target image area to obtain a nonbinary image code, a character/background separating circuit for separating a character/background synthesized image in the target image area into a character portion and a background portion and supplying the character portion and the background portion to the binary image coder and the nonbinary image coder, respectively, and a control circuit for selectively operating the binary image coder and the nonbinary image coder according to a decision result from the coding method deciding circuit. Accordingly, the binary image in the target image area can be coded by a binary image coding method only to thereby reduce the number of bits for coding.

9 Claims, 15 Drawing Sheets

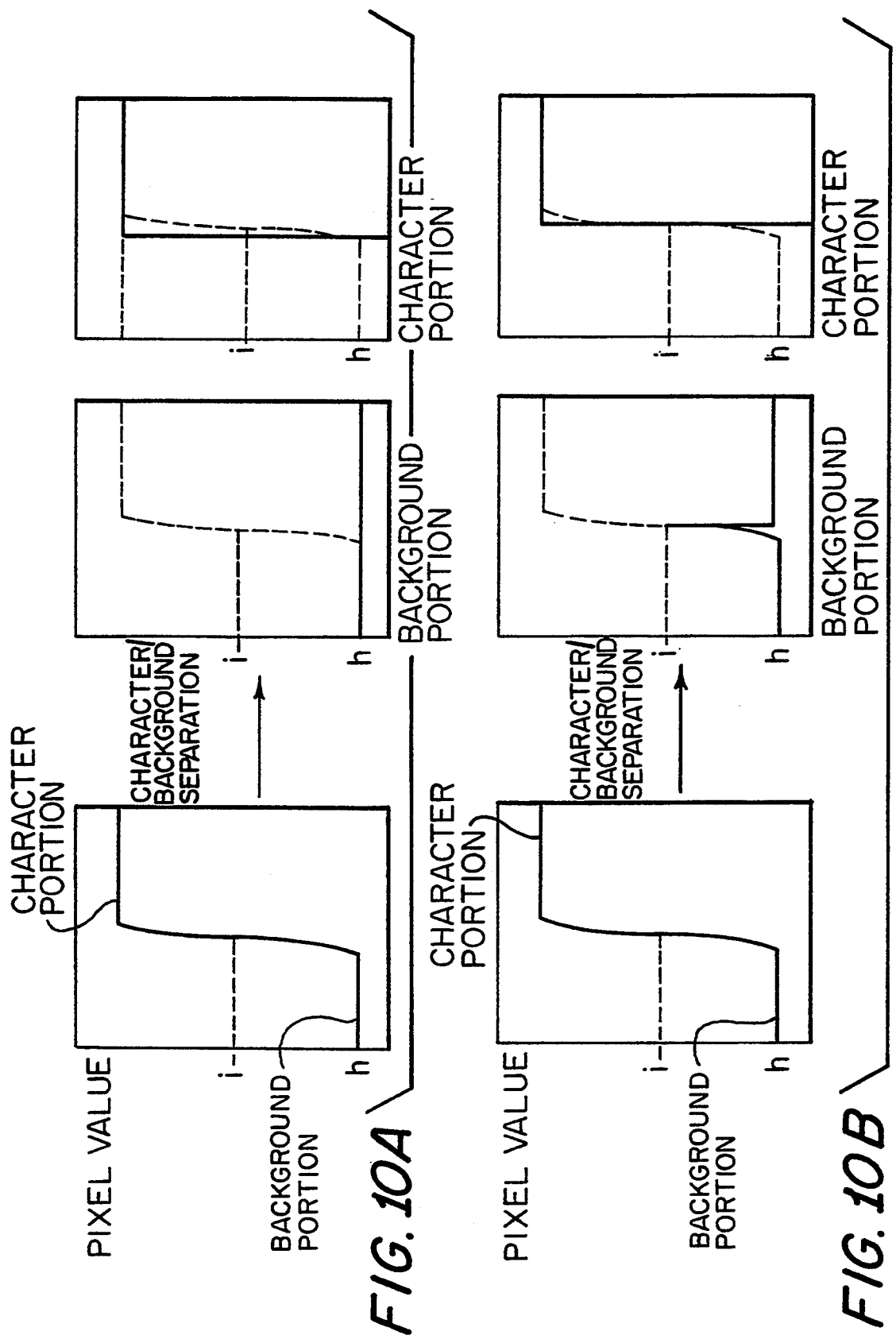

IMAGE CODING DEVICE AND DECODING DEVICE

BACKGROUND OF THE INVENTION

The present invention relates to an image coding device for coding an image signal for use with a color facsimile apparatus or the like, and also relates to an image decoding device for decoding an image coded by such an image coding device.

In a color facsimile apparatus, for example, coding is generally carried out to reduce the quantity of data of a color image.

As a color still picture coding method of various image coding methods is known a JPEG coding method that has been considered on international standardization in JPEG (Joint Photographic Expert Group), a joint of ISO and CCITT.

In the JPEG coding method, an input image is subjected to discrete cosine transformation, quantization, and entropy coding, and compressed data is output. In the case of the color facsimile apparatus, a coding method for a character/photograph mixed document is important. However, when a compression ratio of image data is large in this coding method, quantization error or truncation of a high-frequency component of a spatial frequency of the image causes a deterioration in quality of a character or line image decoded.

To cope with this problem, there have been proposed various image coding methods using a binary image coding method as an information retention type in combination with the JPEG coding method (e.g., Katzuno et al.; "Proposal on High-efficiency Hybrid Coding Method for Color Facsimile"; Electronic Information Communication Society Technical Report CS 91-96, 1991).

FIG. 16 shows an image coding device using this method. In FIG. 16, reference numeral 201 denotes an input image signal. 202 denotes a blocking circuit for dividing the input image signal 201 into a plurality of blocks. 204 denotes a coding mode deciding circuit for deciding a coding method for the input image signal 201. 209 denotes a character/background separating circuit for separating the input image signal 201 into a binary image and a nonbinary image. 2010 denotes a JBIG coder for coding the binary image by a JBIG coding method that has been considered on internal standardization in JBIG (Joint Bi-level Image Expert Group) as a joint of ISO and CCITT. 2011 denotes a JPEG coder for coding the nonbinary image by the JPEG coding method mentioned above. 2015 denotes a decision result obtained in the coding mode deciding circuit 204. 2017 denotes image density information obtained in the character/background separating circuit 209. 2018 denotes a coded result obtained in the JBIG coder 2010. 2019 denotes a coded result obtained in the JPEG coder 2011.

The operation of the image coding device shown in FIG. 16 will now be described. The input image signal 201 is input into the blocking circuit 202. In the blocking circuit 202, the image signal 201 is divided into a plurality of blocks each having (m x n) pixels, e.g., (8×8) pixels. Then, each block is fed to the coding mode deciding circuit 204.

In the coding mode deciding circuit 204, it is decided whether the image block is an area including a character or line graphic (which area will be hereinafter referred to as a character area) or an area excluding a character or line graphic (which area will be hereinafter referred to as a photographic area). More specifically, in the coding mode deciding circuit 204, the maximum $S_{max}$ and the minimum $S_{min}$ of pixel values of (8×8) pixels in each block are examined, and the difference between the maximum $S_{max}$ and the minimum $S_{min}$ is compared with a predetermined value $T_1$. If $S_{max}-S_{min} \geq T_1$, the image block is decided as the character area, while if $S_{max}-S_{min} < T_1$, the image block is decided as the photographic area.

Alternatively, as shown in FIG. 17, in the coding mode deciding circuit 204, the distribution of pixel values of (8×8) pixels in each block is examined, wherein the number of peaks P in this distribution is checked and the difference between the maximum $S_{max}$ and the minimum $S_{min}$ is compared with appropriate values $T_2$ and $T_3$. If $T_3 < S_{max}-S_{min}$, the image block is decided as the character area. If $(T_2 < S_{max}-S_{min} \leq T_3)$ and $(P=1$ or $P=2)$, the image block is decided as the character area. If $(T_2 < S_{max}-S_{min} \leq T_3)$ and $(P \neq 1$ and $P \neq 2)$, the image block is decided as the photographic area. If $S_{max}-S_{min} \leq T_2$, the image block is decided as the photographic area.

Further, the decision result 2015 is output from the coding mode deciding circuit 204. The number of peaks P in the distribution is obtained by an algorithm as shown in FIG. 18, for example.

The image block decided as the character area in the coding mode deciding circuit 204 is fed to the character/background separating circuit 209. In the character/background separating circuit 209, the following operation is carried out as shown in FIG. 19.

As shown in FIG. 4, a pixel value at a position (i, j) in the image block is denoted by $S_{ij}$. Then, the average M of the pixel values in the image block is obtained. Then, a binary image $B_{ij}$ having a value 0 or 1 in the image block is created. That is, the pixel value $S_{ij}$ is compared with the average M to decide the value of the binary image $B_{ij}$ as follows:

If $S_{ij} \geq M$, $B_{ij}=1$

If $S_{ij} < M$, $B_{ij}=0$

The binary image $B_{ij}$ thus obtained is fed to the JBIG coder 2010.

Then, image density information $S_{high}$ and $S_{low}$ are created. That is, the image density information $S_{high}$ is obtained by averaging the pixel values of the pixels satisfying $S_{ij} \geq M$. On the other hand, the image density information $S_{low}$ is obtained by averaging the pixel values of the pixels satisfying $S_{ij} < M$. This density information is output as 2017 shown in FIG. 16.

Then, a difference image $C_{ij}$ is created. That is, the difference image $C_{ij}$ is obtained according to the binary image $B_{ij}$ as follows:

If $B_{ij}=1$, $C_{ij}=S_{ij}-S_{high}+U$

If $B_{ij}=0$, $C_{ij}=S_{ij}-S_{low}+U$ where U represents an obtainable intermediate value of the pixel values of the subject image. In the case where an original image is an edge image containing a low-frequency component as shown in FIG. 20A, the difference image as shown in FIG. 20B is obtained.

Alternatively, the difference image $C_{ij}$ may be created as follows:

If $B_{ij}=0$, $C_{ij}=S_{low}-S_{ij}+U$

In this case, a difference image as shown in FIG. 20C is obtained from the original image shown in FIG. 20A.

This difference image $C_{ij}$ is fed to the JPEG coder 2011, and is coded in the JPEG coder 2011. Then, the code 2019 is output from the JPEG coder 2011.

The binary image $B_{ij}$ from the circuit 209 is coded in the JBIG coder 2010, and the code 2018 is output therefrom.

The image block decided as the photographic area in the coding mode deciding circuit 204 is coded in the JPEG coder 2011, and the code 2019 is output therefrom.

In the image coding device shown in FIG. 16, the decision result 2015, the density information 2017, the JBIG coded result 2018, and the JPEG coded result 2019 are assembled to generate a final code. Alternatively, the decision result 2015 and the JPEG coded result 2019 are assembled to generate a final code.

The above coding method in the prior art has the following problems.

(1) Even when the image block is a completely binary image or an image hardly deteriorated in image quality after converted into a completely binary image (which image will be hereinafter referred to as a semi-binary image), coding is necessary in both the JPEG coding method and the JBIG coding method. As a result, a redundant number of bits for coding is required.

(2) When a character image or a line image containing a low-frequency component as shown in FIG. 20A is input, a small change is generated in the difference image (see FIG. 20B or FIG. 20C) left by subtraction of the binary image from the original image (see FIG. 20A), that is, a high-frequency component in a spatial frequency of the image is generated. As a result, an image quality is deteriorated rather more as compared with the case where the image is coded by the JPEG coding method only.

SUMMARY OF THE INVENTION

It is accordingly an object of the present invention to provide an image coding device which can code a binary image or a semi-binary image by using a binary image coding method only to thereby reduce the number of bits for coding.

It is another object of the present invention to provide an image decoding device which can suppress a small change in a difference image left by subtraction of a binary image from an original image by using suitable character/background separating means which does not recognize an image containing a low-frequency component as an image containing a character, thereby improving a decoded image quality.

According to the present invention, there is provided an image coding device comprising means for inputting an image signal; dividing means for dividing said image signal input into said inputting means into a plurality of image areas; coding method deciding means for examining pixel values of an image in a target one of said image areas divided by said dividing means and deciding a coding method for said target image area; binary image coding means for coding said image in said target image area to obtain a binary image code; nonbinary image coding means for coding said image in said target image area to obtain a nonbinary image code; character/background separating means for separating said image in said target image area into a character portion and a background portion except said character portion and supplying said character portion and said background portion to said binary image coding means and said nonbinary image coding means,respectively; and control means for selectively operating said binary image coding means and said nonbinary image coding means according to a decision result obtained in said coding method deciding means.

In operation, an input image signal is divided into a plurality of image areas, and a coding method is selected for every image area divided above. If the image area is decided as a binary image or a semi-binary image, binary image coding is carried out for the binary image or the semi-binary image. If the image area is decided as a synthesized image of a nonbinary image and a character or line image (such a synthesized image will be hereinafter referred to as a character/background synthesized image), the character or line image is separated from the nonbinary image. Then, nonbinary image coding is carried out for the nonbinary image, and binary image coding is carried out from the character or line image. If the image area is decided as a nonbinary image excluding a character or line image (such a nonbinary image will be hereinafter referred to as a photographic image), nonbinary image coding is carried out for the photographic image.

As described above, according to the present invention, a binary image or a semi-binary image is coded by the binary image coder only. Accordingly, as compared with the prior art method, a coding efficiency to a binary image area or a semi-binary image area can be improved, and accordingly a coding efficiency to a whole image can be improved. For example, assuming that a code quantity of a binary image code is denoted by A and a code quantity of a nonbinary image code is denoted by B in coding a binary image area or a semi-binary image area, a code quantity of the image area becomes (A+B) in the prior art method. To the contrary, according to the present invention, the code quantity of the image area becomes A only.

Furthermore, according to the present invention, a proper threshold can be set in separating a character image from a background image, and a sharp change in the background image can be suppressed. Accordingly, as compared with the prior art method, an image quality can be improved. Further, in obtaining an image quality equal to that in the prior art method, a coding efficiency can be improved.

Other objects and features of the invention will be more fully understood from the following detailed description and appended claims when taken with the accompanying drawings.

BRIEF DESCRIPTION OF THE DRAWINGS

FIGS. 10A and 10B are schematic diagrams illustrating the operation of a character/background separating circuit used in the image coding device shown in FIG. 1;

DETAILED DESCRIPTION OF THE PREFERRED EMBODIMENTS

Figure 1:
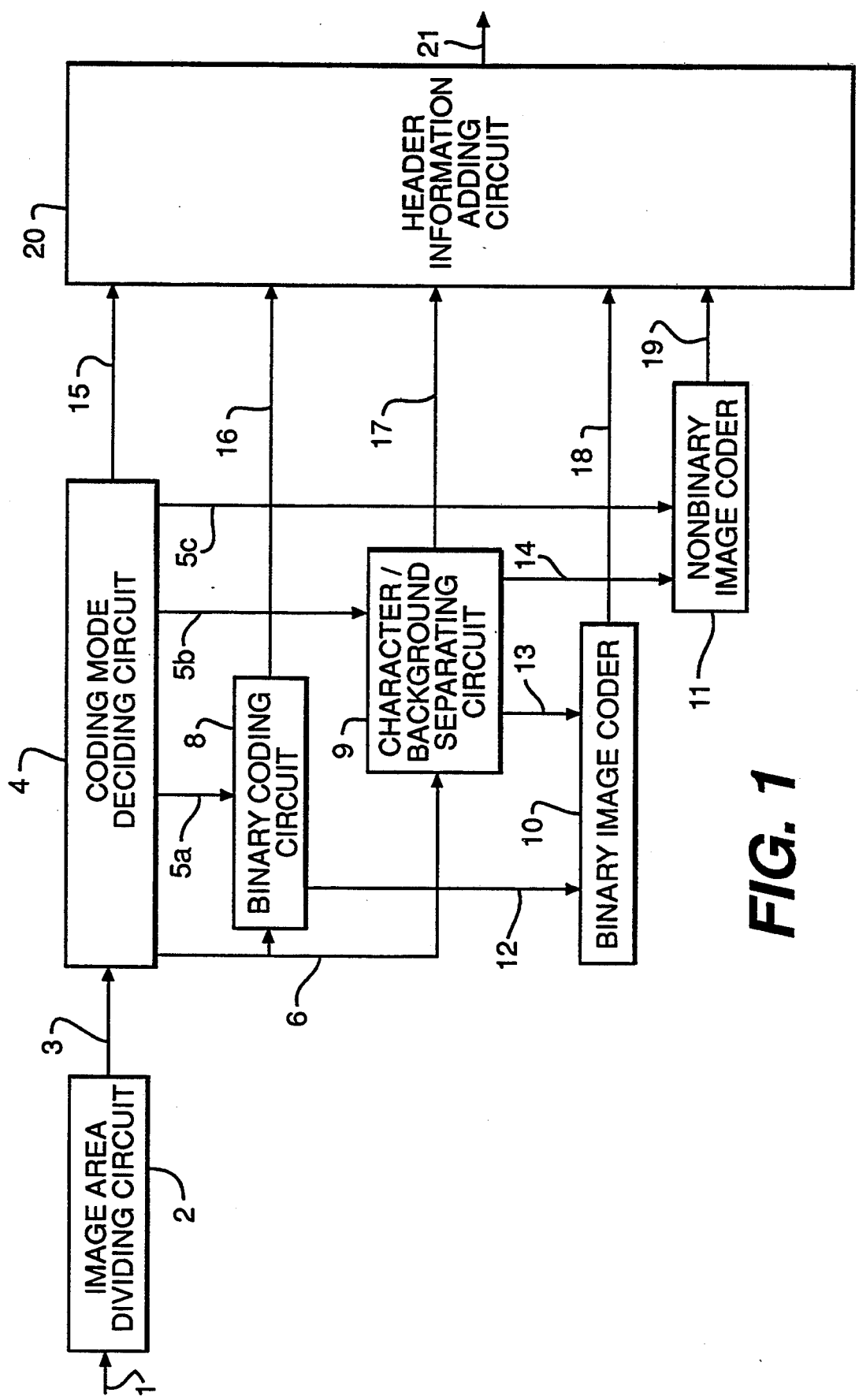
FIG. 1 is a block diagram of an image coding device according to the present invention.

A preferred embodiment of the present invention will now be described with reference to the drawings. FIG. 1 is a block diagram of an image coding device according to the present invention. In FIG. 1, reference numeral 1 denotes an input image signal. 2 denotes an image area dividing circuit for dividing the input image signal 1 into predetermined image areas. 3 denotes an image signal obtained by dividing the input image signal 1 into the predetermined image areas. 4 denotes a coding mode deciding circuit for determining a state of the image signal 3 and deciding a coding method for the image signal 3. 5a denotes an image signal decided as a binary image or a semi-binary image in the coding mode deciding circuit 4. 5b denotes an image signal decided as a character/background synthesized image in the coding mode deciding circuit 4. 5c denotes an image signal decided as a photographic image in the coding mode deciding circuit 4. 6 denotes pixel value distribution information obtained in the coding mode deciding circuit 4. 8 denotes a binary coding circuit for completely binary-coding the image signal 5a decided as a binary image and separating it into a binary image signal 12 and image density information 16. 9 denotes a character/background separating circuit for separating the image signal 5b decided as a character/background synthesized image into a binary image signal 13, a background image signal 14, and image density information 17. 10 denotes a binary image coder for coding the binary image signal 12 or 13. 11 denotes a nonbinary image coder for coding the photographic image 5c or the background image signal 14. 15 denotes a decision result, or a coding mode obtained in the coding mode deciding circuit 4. 18 denotes a coded result obtained in the binary image coder 10. 19 denotes a coded result obtained in the nonbinary image coder 11. 20 denotes a header information adding circuit for assembling the decision result 15, the density information 16 or 17, and the binary image code 18 or the nonbinary image code 19. 21 denotes a final coded result.

Figure 2:
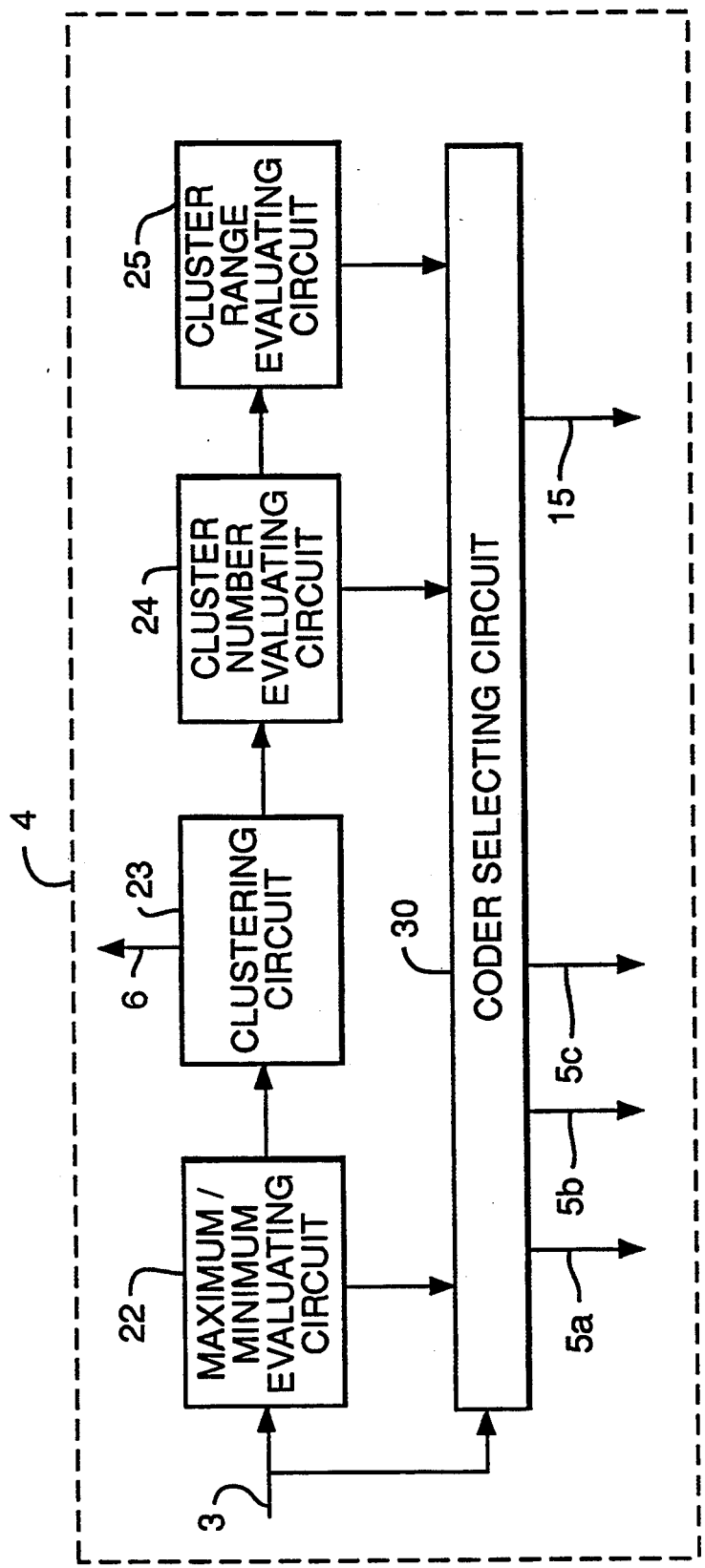
FIG. 2 is a block diagram of a coding mode deciding circuit used in the image coding device shown in FIG. 1.

FIG. 2 is a block diagram of the coding mode deciding circuit 4. 22 denotes a maximum/minimum evaluating circuit for evaluating the maximum and the minimum of pixel values in the image area signal 3 input into the coding mode deciding circuit 4. 23 denotes a clustering circuit for grouping thee pixels in the image area signal 3 into a plurality of sets (which will be hereinafter referred to as clusters) according to the pixel values. 24 denotes a cluster number evaluating circuit for evaluating the number of clusters. 25 denotes a cluster range evaluating circuit for evaluating the range of presence of the pixel values in each cluster. 30 denotes a coder selecting circuit for outputting the image area signal 5a, 5b, or 5c according to a decision result obtained in the maximum/minimum evaluating circuit 22, a decision result obtained in the cluster number evaluating circuit 24, or a decision result obtained in the cluster range evaluating circuit 25.

Figure 3:
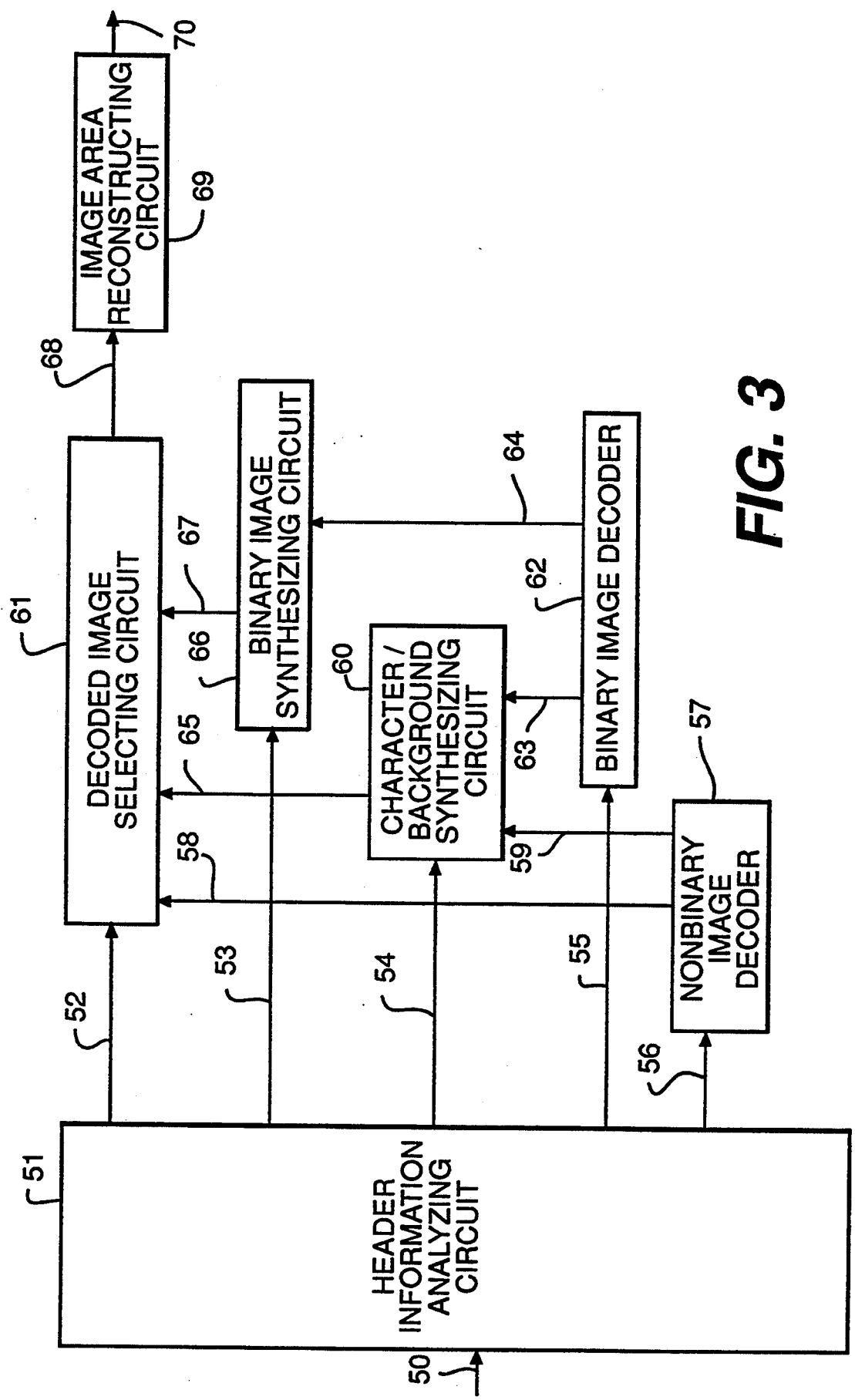
FIG. 3 is a block diagram of an image decoding device for decoding information coded by the image coding device according to the present invention.

FIG. 3 is a block diagram of an image decoding device for decoding the information coded by the image coding device according to the present invention. 50 denotes coded information fed from a transmission channel or a storage device. 51 denotes a header information analyzing circuit for analyzing header information in the coded information. 57 denotes a nonbinary image decoder for decoding a nonbinary image code 56. 62 denotes a binary image decoder for decoding a binary image code 55. 60 denotes a character/background synthesizing circuit for synthesizing a character image and a background image from a nonbinary image decoded result 59, a binary image decoded result 63, and image density information 54. 66 denotes a binary image synthesizing circuit for synthesizing a binary image from a binary image decoded result 64 and image density information 53. 61 denotes a decoded image selecting circuit for selecting a decoded image from a decoded result 58 obtained in the nonbinary image coder 57, a synthesized result 65 obtained in the character/background synthesizing circuit 60, or a synthesized result 67 obtained in the binary image synthesizing circuit 66 on the basis of coding mode information 52 contained in the header information. 69 denotes an image area reconstructing circuit 69 for reconstructing decoded image blocks 68 selected by the selecting circuit 61 and restoring an original image.

Figure 4:
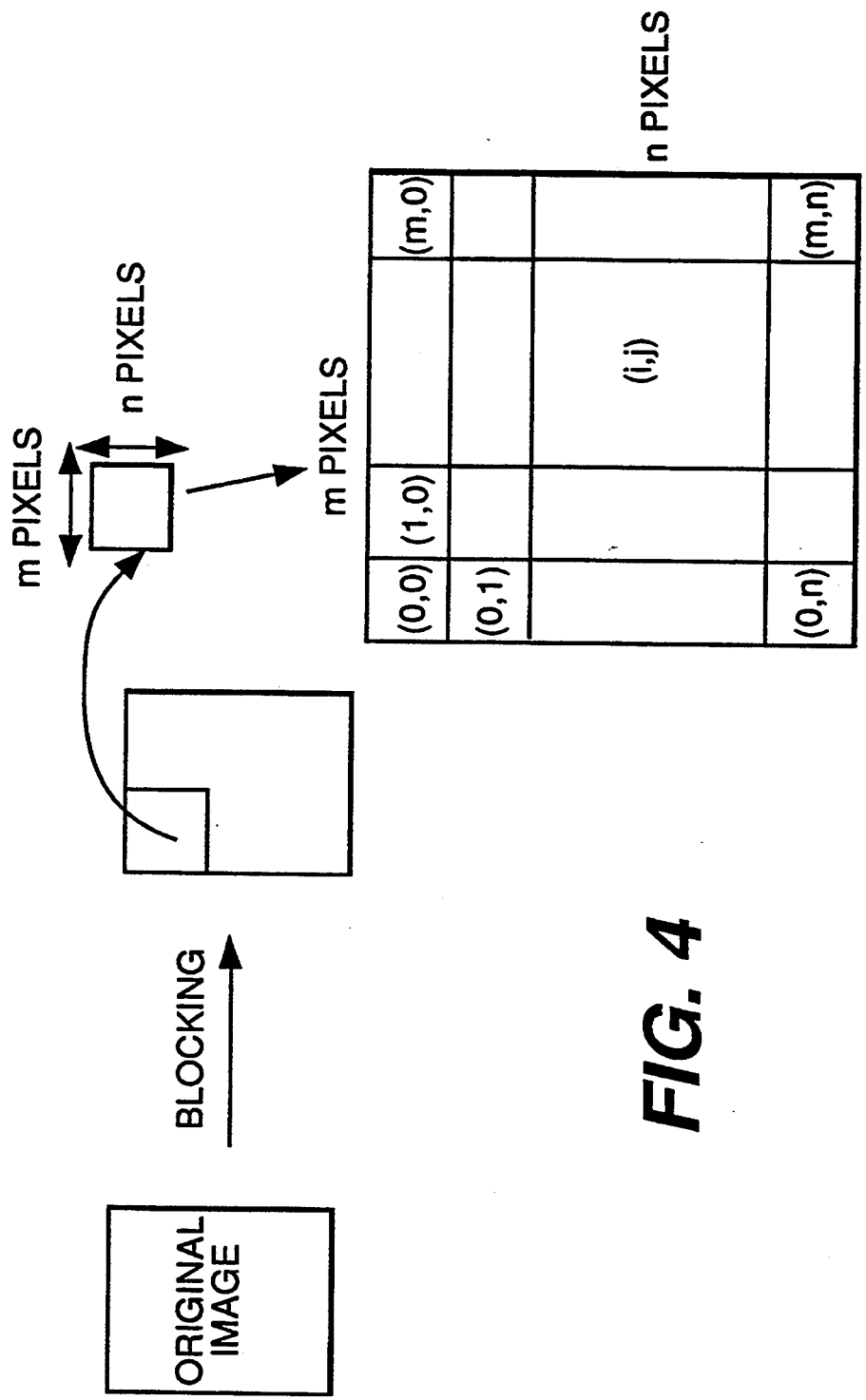
FIG. 4 is a schematic diagram illustrating an example of image area division in coding an image.

The operation of the image coding device will now be described with reference to FIGS. 1 and 2. The input image signal 1 shown in FIG. 1 is divided by the image area dividing circuit 2 into a plurality of image areas each having (m x n) pixels as schematically shown in FIG. 4, for example. The coding method for the image area signal 3 obtained in the image area dividing circuit 2 is decided in the coding mode deciding circuit 4.

Figure 5:
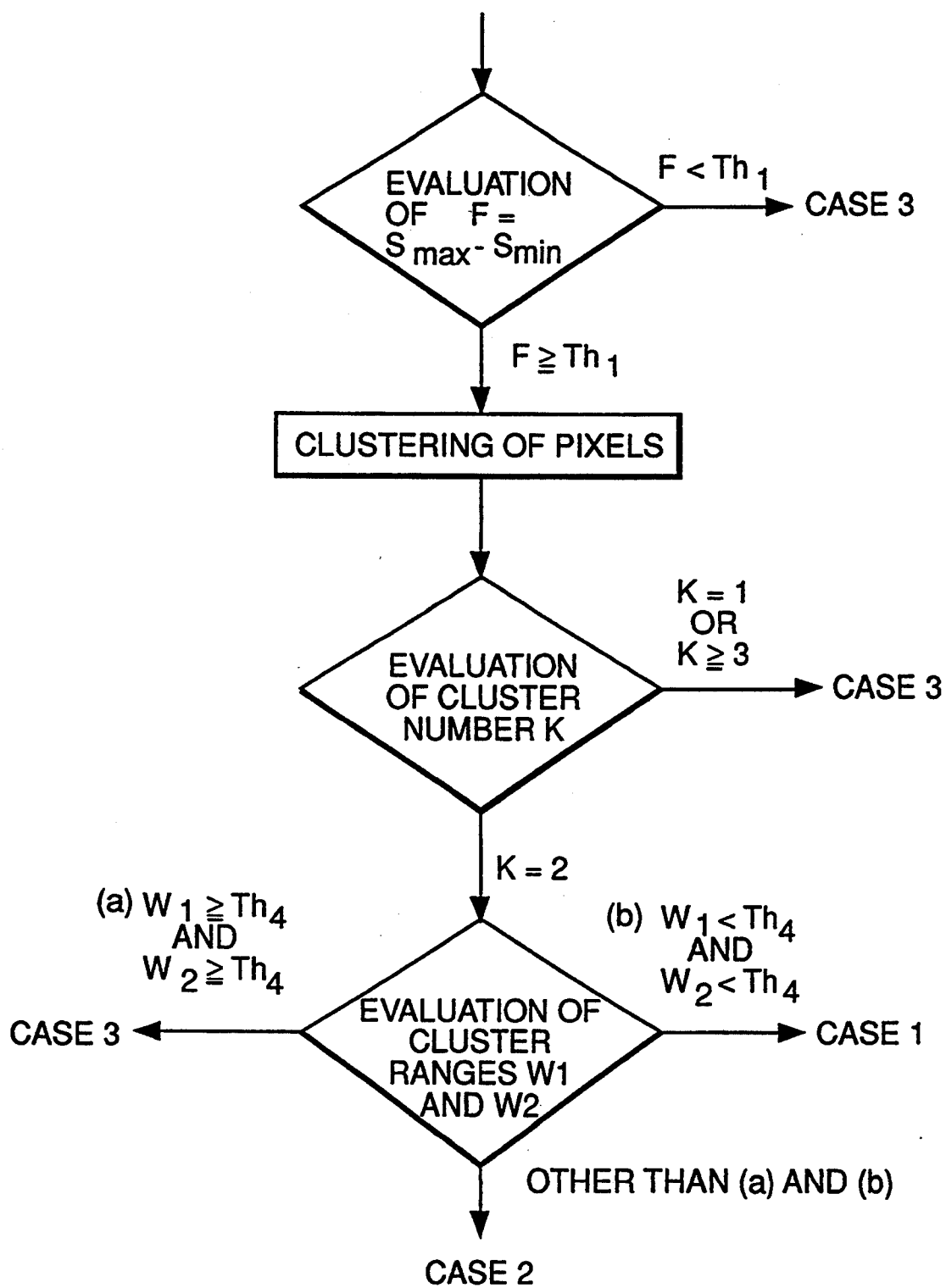
FIG. 5 is a flowchart of the operation of the coding mode deciding circuit used in the image coding device shown in FIG. 1.

In the coding mode deciding circuit 4, one of the following three kinds of modes is decided.

case 1: a binary image or a semi-binary image composed of a character or line image only case 2: a character/background synthesized image composed of a character or line image and a background image as a nonbinary image case 3: a photographic image excluding a character or line image The mode deciding operation in the coding mode deciding circuit 4 shown in FIG. 2 will be described. As shown in FIG. 5, the difference F between the maximum $S_{max}$ and the minimum $S_{min}$ of pixel values of pixels in a target image area is evaluated in the maximum/minimum evaluating circuit 22. That is, the difference F is compared with a predetermined threshold $Th_1$. If $F=S_{max}-S_{min}<Th_1$, the mode is decided as case 3, while $F=S_{max}-S_{min}\geq Th_1$, the image area signal is fed to the clustering circuit 23.

Figure 6:
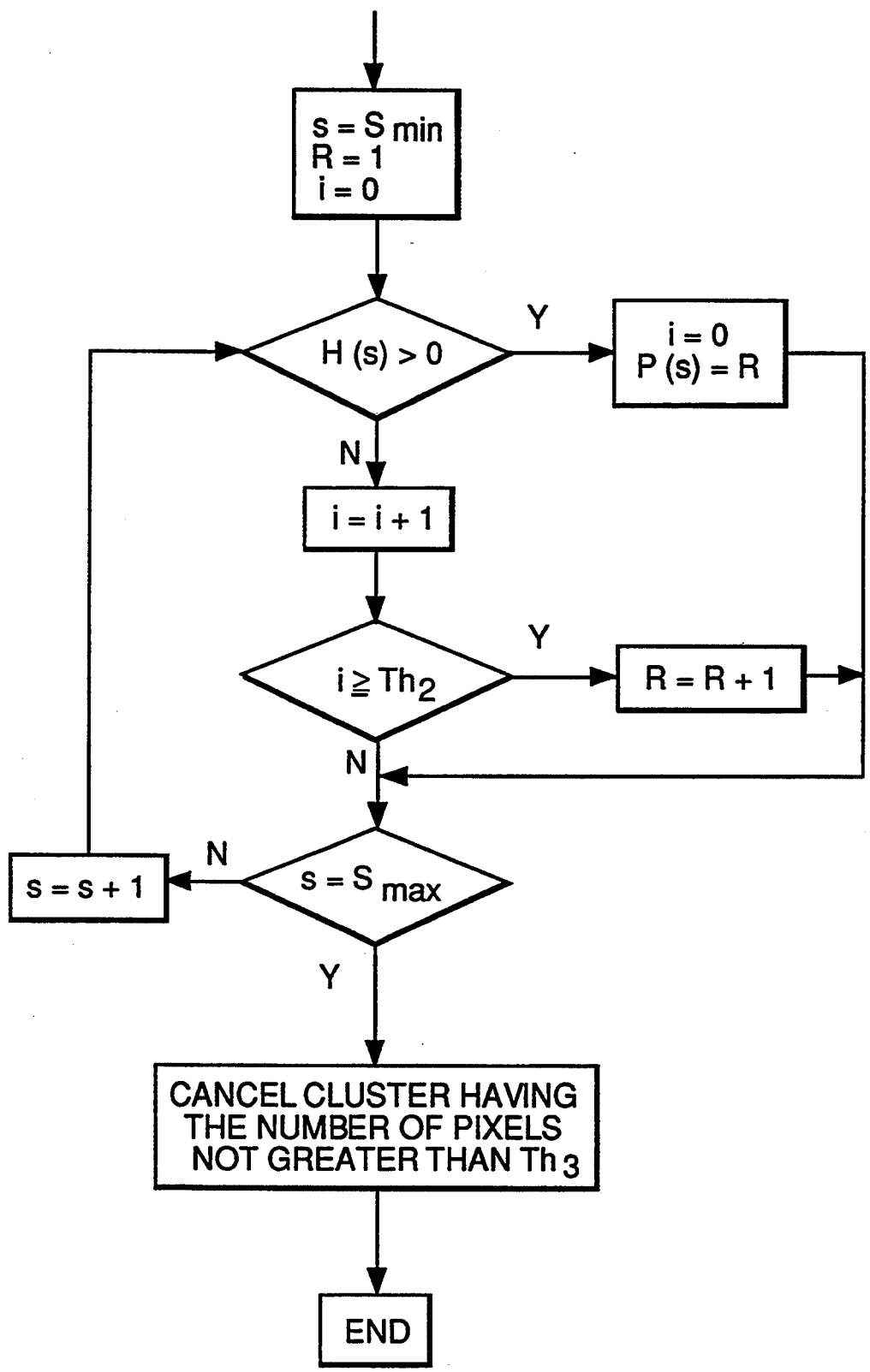
FIG. 6 is a flowchart of the operation of a clustering circuit used in the image coding device shown in FIG. 1.

In the clustering circuit 23, the frequency distribution of the pixel values in the image area signal fed above is obtained to thereby cluster the pixels in the image area. For example, assuming that the number of pixels having a pixel value s is denoted by H(s), the clusters are numbered from 1 to R in series, and the cluster number of the cluster containing the pixels having the pixel value s is denoted by P(s), the pixels in the image area can be clustered according to an algorithm as shown in FIG. 6 with use of predetermined thresholds $Th_2$ ($Th_2 \geq 0$) and $Th_3$. According to this algorithm, the pixels having the pixel values whose difference is less than a predetermined threshold belong to the same cluster. R shows a result obtained in the clustering circuit 23. The maximum K of R and the cluster number P(s) show cluster information. This cluster information, or the pixel value distribution information 6 is fed to the binary coding circuit 8 and the character/background separating circuit 9.

Then, the number of clusters K is evaluated in the cluster number evaluating circuit 24 according to the cluster information. That is, the following decision is carried out. If K=1 or K≧3, the mode is decided as case 3, while if K=2, the cluster information is fed to the cluster range evaluating circuit 25.

In the cluster range evaluating circuit 25, the ranges $W_1$ and $W_2$ of the two clusters are evaluated with use of a predetermined threshold $Th_4$ as shown in FIG. 5. The ranges $W_1$ and $W_2$ mean the difference between the maximum and the minimum of the pixel values of the pixels in each cluster. In this evaluation, the following decision is carried out. If $W_1<Th_4$ and $W_2<Th_4$, the mode is decided as case 1; if $W_1 \geq Th_4$ and $W_2 \geq Th_4$, the mode is decided as case 3; and if $W_1$ and $W_2$ have any values other than the above, the mode is decided as case 2.

Then, in the coder selecting circuit 30, a coder for coding a target image area is selected according to the decision result in the maximum/minimum evaluating circuit 22, the decision result in the cluster number evaluating circuit 24, and the decision result in the cluster range evaluating circuit 25.

Figure 7A:
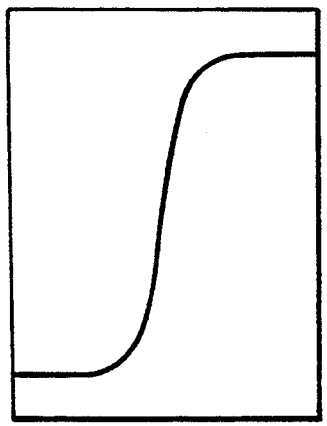
FIGS. 7A and 7B are schematic diagrams illustrating the operation of the coding mode deciding circuit used in the image coding device shown in FIG. 1.
Figure 7B:
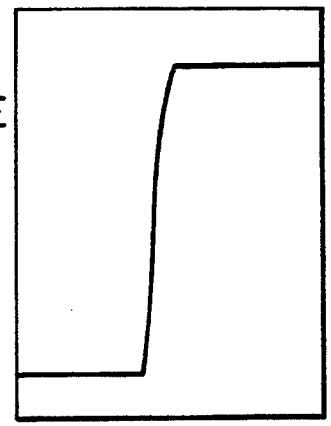

As described above, the predetermined thresholds $Th_2$ and $Th_3$ are set in the coding mode deciding circuit 4 to thereby decide that a gentle edge including a low-frequency component as shown in FIG. 7A is a photographic image, and decide that a sharp edge excluding a low-frequency component as shown in FIG. 7B is an image including a character or line image.

The image area decided as case 1 in the coding mode deciding circuit 4 is separated into the binary image signal 12 and the image density information 16 in the binary coding circuit 8 shown in FIG. 1.

Figure 8:
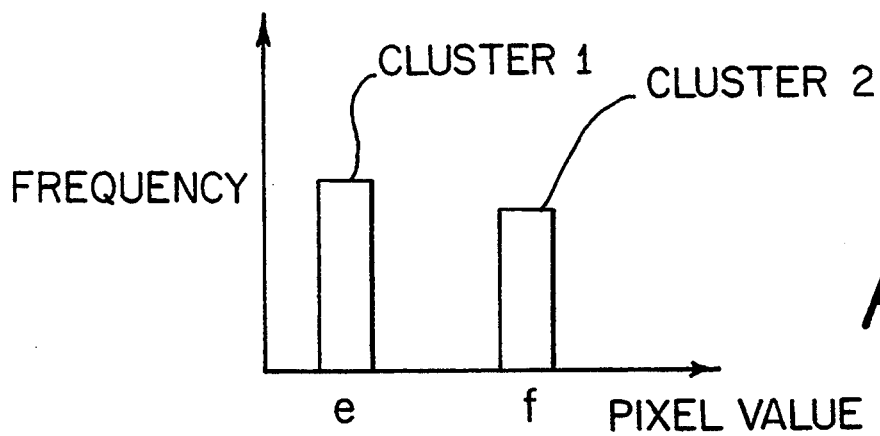
FIG. 8 is a graph illustrating clusters for a binary image or a semi-binary image.

As a result, the image area decided as case 1 has a frequency distribution including two clusters as shown in FIG. 8. For example, a binary image $B_{ij}$ can be obtained by setting a threshold $Th_5$ at the middle point between the maximum (point e) of pixel values of pixels in a cluster 1 and the minimum (point f) of pixel values of pixels in a cluster 2 shown in FIG. 8. In this case, the binary image $B_{ij}$ is given as follows:

If $S_{ij}<Th_5$, $B_{ij}=0$

If $S_{ij} \geq Th_5$, $B_{ij}=1$ where $S_{ij}$ represents a pixel value at a position (i, j) in the image area. This binary image information 12 is fed to the binary image coder 10. Further, typical values in the two clusters are defined, and they are denoted by $S_H$ and $S_L$. For example, the typical values $S_H$ and $S_L$ are defined as the averages of the pixel values in the two clusters as follows:

$S_L=(\Sigma S_{ij})/N_0$ where $B_{ij}=0$, and $N_0$ represents the number of pixels corresponding to $B_{ij}=0$.

$S_H=(\Sigma S_{ij})/N_1$ where $B_{ij}=1$, and $N_1$ represents the number of pixels corresponding to $B_{ij}=1$.

These typical values $S_H$ and $S_L$ are fed as the image density information 16 to the header information adding circuit 20.

In coding a binary image or a semi-binary image, the prior art method requires both nonbinary coding and binary coding. To the contrary, this preferred embodiment requires binary coding only to thereby greatly improve a coding efficiency.

Further, the image area decided as case 2 in the coding mode deciding circuit 4 is separated into the binary image signal 13, the background image signal 14, and the image density information 17 in the character/background separating circuit 9.

Figure 9A:
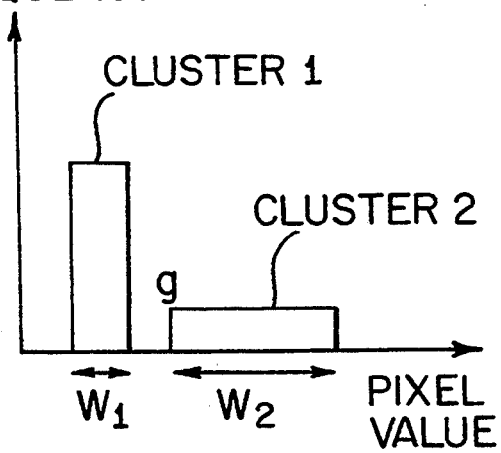
FIGS. 9A and 9B are graphs illustrating clusters for a character/background synthesized image.
Figure 9B:
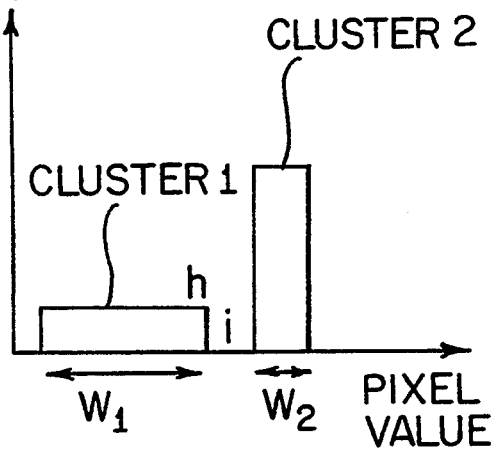

As a result, the image area decided as case 2 has a frequency distribution including two clusters as shown in FIGS. 9A or 9B. One of the two clusters having a smaller range $W_1$ or $W_2$ is regarded as a character or line image, and it is separated from the image area. In the case of FIG. 9A, that is, in the case of $W_1<W_2$, a binary image $B_{ij}$ can be obtained by setting a threshold $Th_6$ at the minimum (point g) of pixel values of pixels in a cluster 2 shown in FIG. 9A. In this case, the binary image $B_{ij}$ is given as follows:

If $S_{ij}<Th_6$, $B_{ij}=1$

If $S_{ij} \geq Th_6$, $B_{ij}=0$

In the case of FIG. 9B, that is, in the case of $W_1 \geq W_2$, a binary image $B_{ij}$ can be obtained by setting a threshold $Th_6$ at the maximum (point h) of pixel values of pixels in a cluster 1 shown in, FIG. 9B. In this case, the binary image $B_{ij}$ is given as follows:

If $S_{ij} < Th_6$, $B_{ij} = 0$

If $S_{ij} \geq Th_6$, $B_{ij} = 1$

Further, typical values in the two clusters are defined, and they are denoted by $S_T$ and $S_I$. For example, the typical values $S_T$ and $S_I$ are defined as the averages of the pixel values in the two clusters as follows:

$$S_I = (\Sigma S_{ij})/N_0$$

where $B_{ij} = 0$, and $N_0$ represents the number of pixels corresponding to $B_{ij} = 0$.

$$S_T = (\Sigma S_{ij})/N_1$$

where $B_{ij} = 1$, and $N_1$ represents the number of pixels corresponding to $B_{ij} = 1$.

These typical values $S_T$ and $S_I$ are fed as the image density information 17 to the header information adding circuit 20. Further, assuming that a pixel value at a position (i, j) in the background image separated is denoted by $C_{ij}$, the pixel value $C_{ij}$ is given as follows:

If $B_{ij} = 0$, $C_{ij} = S_{ij}$

If $B_{ij} = 1$, $C_{ij} = SI$

The pixel value $C_{ij}$ is fed as the background image signal 14 to the nonbinary image coder 11, in which nonbinary image coding of the background image is carried out.

If a threshold is set at a point i shown in FIG. 9B in the character/background separating circuit 9, the background image separated becomes an image with a sharp change as shown in FIG. 10B. To the contrary, by setting the threshold $Th_6$ at the point h shown in FIG. 9B as mentioned above, the background image separated can be made into a smooth image without a sharp change as shown in FIG. 10A.

Further, the image area decided as case 3 in the coding mode deciding circuit 4 is fed to the nonbinary image coder 11, in which nonbinary image coding of the photographic image is carried out.

In the binary image coder 10 shown in FIG. 1, the JBIG method as mentioned in the prior art is used, for example. In the nonbinary image coder 11 shown in FIG. 1, the JPEG method as mentioned in the prior art is used, for example.

Figure 11:
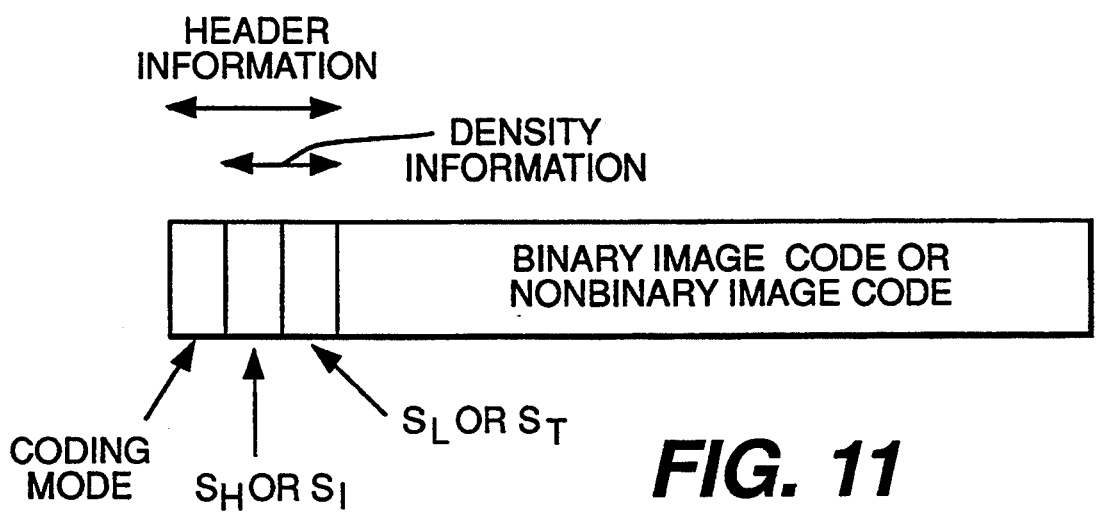
FIG. 11 is a schematic diagram illustrating a header information adding method in coding an image.

In the header information adding circuit 20, header information consisting of the coding mode 15 and the image density information 16 or 17 is added to the binary image code 18 or the nonbinary image code 19 as shown in FIG. 11, and is then output as the final code 21.

Figure 18:
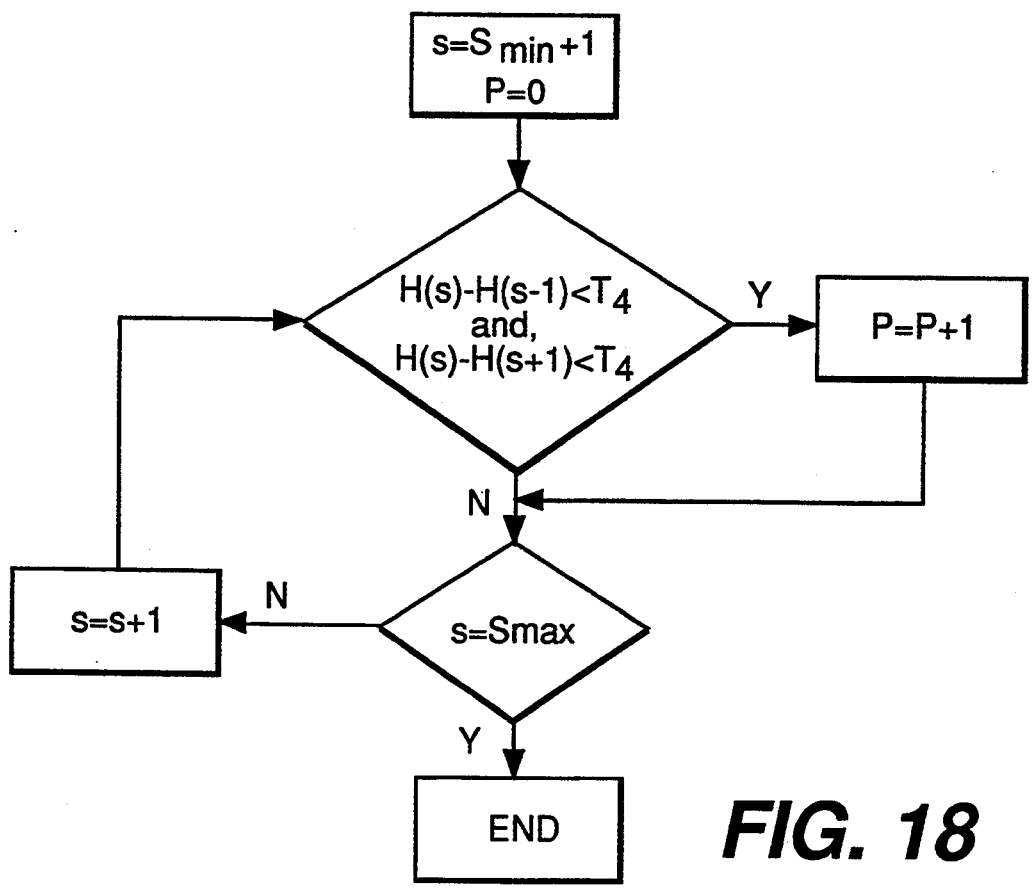
FIG. 18 is a flowchart showing an algorithm for obtaining the number of peaks in the distribution of pixel values.
Figure 19:
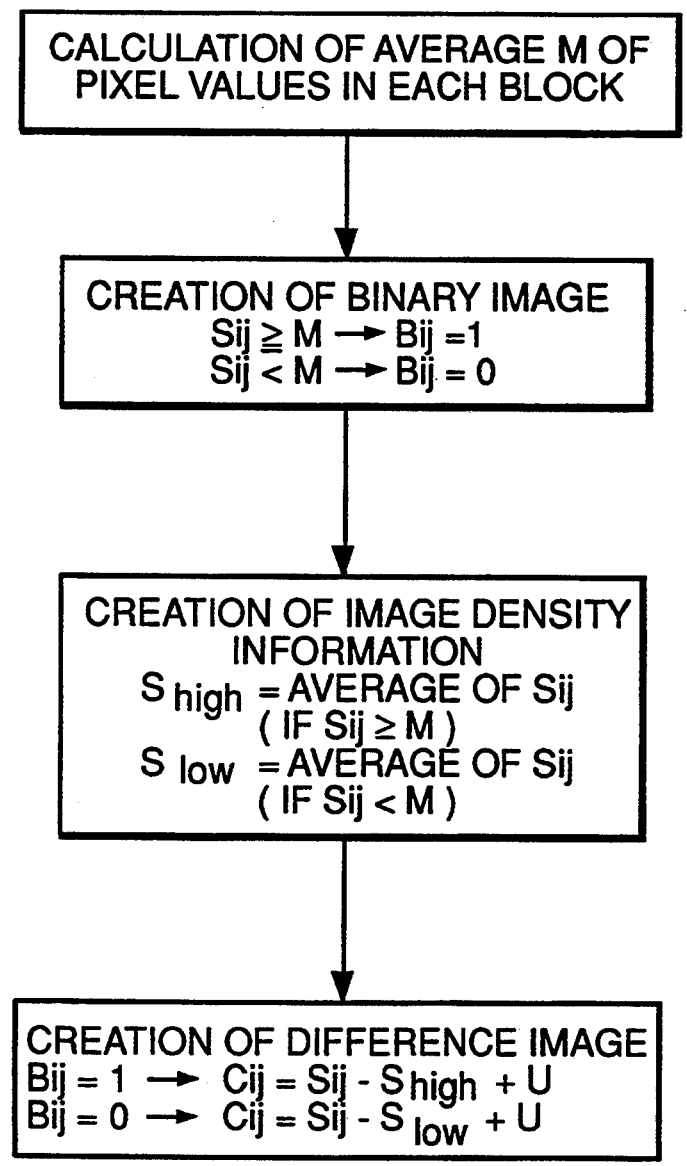
FIG. 19 is a flowchart of the operation of the image coding device shown in FIG. 16.
Figure 20C:
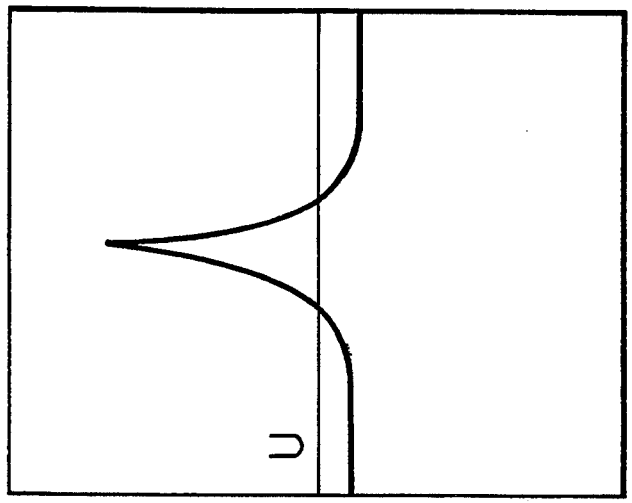
FIGS. 20A, 20B, and 20C are schematic diagrams illustrating the operation of a character/background separating circuit used in the image coding device shown in FIG. 16.
Figure 20B:
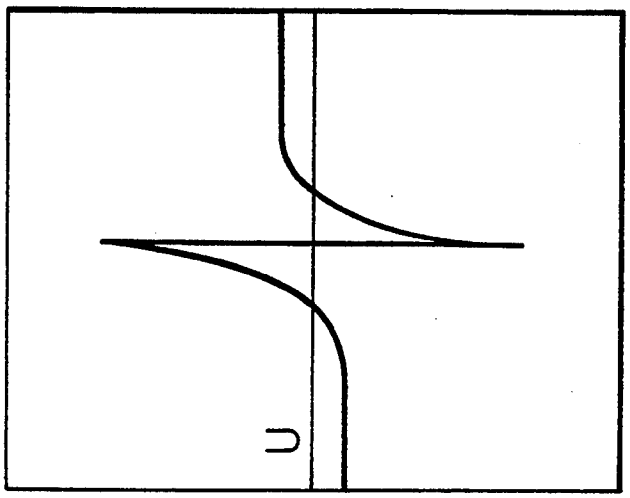
Figure 20A:
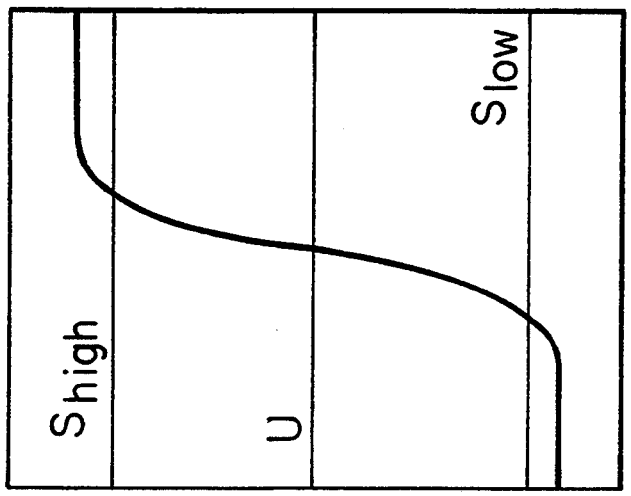

In the preferred embodiment shown in FIG. 1, an additional circuit in comparison with the prior art is the binary coding circuit 8 only. Furthermore, the algorithm in the coding mode deciding circuit shown in FIG. 2 is the algorithm shown in FIGS. 5 and 6, and it is hardly different in complexity from the algorithm in the coding mode selecting circuit in the prior art shown in FIG. 18. Thus, in this preferred embodiment, a coding efficiency can be greatly improved with a simple circuit construction, and a reproduction image quality can be improved.

The operation of the image decoding device will now be described with reference to FIG. 3. The header information analyzing circuit 51 analyzes the header of the coded information 50. When the mode is case 1, the circuit 51 outputs the binary image code 55 to the binary image decoder 62, and outputs the image density information 53 to the binary image synthesizing circuit 66. The binary image decoder 62 performs a decoding operation corresponding to the binary image coder 10 shown in FIG. 1. Assuming that the value of the output 64 from the binary image decoder 62 at a position (i, j) is denoted by $B_{ij}'$, and the synthesized result 67 obtained in the binary image synthesizing circuit 66 is denoted by $S_{ij}'$, the synthesized result 67 is given as follows, for example:

If $B_{ij}' = 0$, $S_{ij}' = S_L$

If $B_{ij}' = 1$, $S_{ij}' = S_H$ where $S_L$ and $S_H$ represent image density information.

When the mode is case 2, the circuit 51 outputs the binary image code 55 to the binary image decoder 62, outputs the nonbinary image code 56 to the nonbinary image decoder 57, and outputs the image density information 54 to the character/background synthesizing circuit 60. The nonbinary image decoder 57 performs a decoding operation corresponding to the nonbinary image coder 11 shown in FIG. 1. Assuming that the value of the output 64 from the binary image decoder 62 at a position (i, j) is denoted by $B_{ij}'$, the value of the output 59 from the nonbinary image decoder 57 at a position (i, j) is denoted by $C_{ij}'$, and the synthesized result 65 obtained in the character/background synthesizing circuit 60 is denoted by $S_{ij}'$, the synthesized result 65 is given as follows, for example:

If $B_{ij}' = 0$, $S_{ij}' = C_{ij}'$

If $B_{ij}' = 1$, $S_{ij} = C_{ij}' + S_T - S_I$ where $S_T$ and $S_I$ represent image density information.

When the mode is case 3, the circuit 51 outputs the nonbinary image code 56 to the nonbinary image decoder 57. The nonbinary image decoder 57 performs a decoding operation corresponding to the nonbinary image coder 11 shown in FIG. 1, and outputs the decoded result 58.

The decoded image selecting circuit 61 selects a decoded image from the decoded result 58 and the synthesized results 65 and 67 according to the coding mode information 52 included in the header information, and outputs the decoded image to the image area reconstructing circuit 69. The image area reconstructing circuit 69 reconstructs the image areas to output the final decoded image 70.

In the preferred embodiment mentioned above, a coding method is decided by obtaining the frequency distribution of pixel values of pixels in the target image area, clustering the pixels according to the pixel values, and examining the characteristics of the clusters to thereby decide the state of the pixels in the image area. In addition thereto, a coding method for image areas adjacent to the target image area may be used as information, thereby avoiding the instability of the decision result. The deciding method in this case will now be described.

Figure 12:
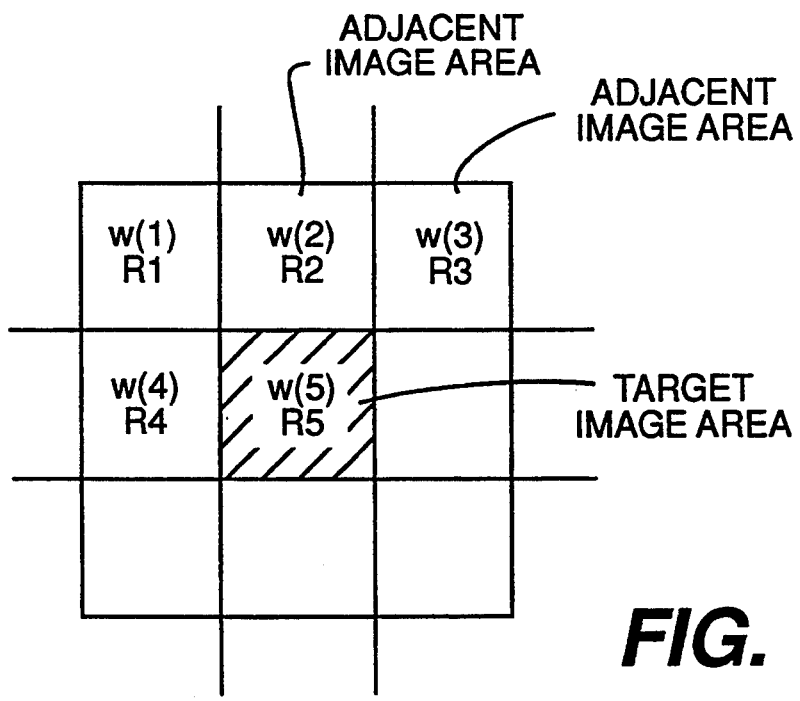
FIG. 12 is a schematic diagram illustrating the operation of the coding mode deciding circuit in the case where a coding method for image areas adjacent to a target image area is additionally used as decision information.

For example, as shown in FIG. 12, the image areas are denoted by R1, R2, ..., R5, ..., and the target image area whose coding mode is to be decided is denoted by R5. Further, if the decision results in the image areas Ri (i=1, 2, ...) are case 1, the following expressions are given.

case 1(i)=1 case 2(i)=0 case 3(i)=0

Similarly, if the decision results in the image areas Ri are case 2, case 2(i) only is set 1, and the others are set to 0. Then, a weighting factor w(i) is set to each image area, and the following values are calculated.

$C_1 = \Sigma w(i) \text{case } 1(i)$ $C_2 = \Sigma w(i) \text{case } 2(i)$ $C_3 = \Sigma w(i) \text{case } 3(i)$ If $C_1$ is the maximum, the mode is decided as case 1. If $C_2$ is the maximum, the mode is decided as case 2. If $C_3$ is the maximum, the mode is decided as case 3. In this manner, the pixel values in the target image area are examined, and additionally, the coding method for the image areas adjacent to the target image area which coding method has already been decided is referred, thereby avoiding the instability of the decision result. The above decisions are made in the coding mode deciding circuit 4.

Further, in deciding a coding method for the target image area, not only the pixel values in the target image area may be examined, but also the pixel values in the image area containing the pixels in the proximity to the target image area may be examined, thereby avoiding the instability of the decision result. The deciding method in this case will now be described.

Figure 13:
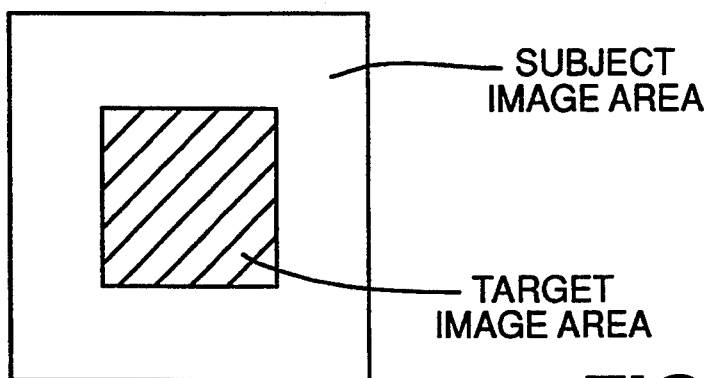
FIG. 13 is a schematic diagram illustrating the operation of the coding mode deciding circuit in the case where pixel values in an image area containing pixels in the proximity to a target image area is additionally used as decision information.

As previously mentioned, in the image area dividing circuit 2, the input image signal 1 shown in FIG. 1 is divided into a plurality of image areas each having (m x n) pixels as schematically shown in FIG. 4, for example. As shown in FIG. 13, the target image area (shown as a hatched portion) is to be coded. The target image area and the image area containing the pixels in the proximity to the target image area are defined as a subject image area to be subjected to the decision. The subject image area as shown in FIG. 13 is divided from the input image signal 1 in the image area dividing circuit 2. The coding method for the target image area is decided by examining the pixel values in the subject image area in the coding mode deciding circuit 4. In this manner, the subject image area is set larger than the target image area, thereby reducing the instability of the coding mode decision.

In the preferred embodiment mentioned above, the binary coding circuit 8 and the character/background separating circuit 9 shown in FIG. 1 are independent of each other. However, since the binary coding circuit 8 and the character/background separating circuit 9 are not simultaneously used, the binary coding circuit 8 may be replaced by a binary coding circuit included in the character/background separating circuit 9, thereby further simplifying the circuit construction.

Further, as shown in FIG. 5, the maximum and the minimum of pixel values of pixels in the image area are first evaluated in the coding mode deciding circuit 4. However, this evaluation is not essential. Instead of this evaluation, the value of a differential image or a quadratic differential image of an image in the image area may be evaluated to thereby decide whether or not an edge in the image area is present.

Further, while the size of the image area is set to (m x n) in a rectangular shape in this preferred embodiment, the shape of the image area is not limited to the rectangular shape.

Further, as shown in FIG. 11, the header information 15 to be added in the header information adding circuit 20 is located at the head of the coded information in an image area. However, the location of the header information 15 to be added in the header information adding circuit 20 is not limited to the above, but any location in the coded information is allowed as far as the image area can be identified by the header information.

Further, while the threshold for binary coding in the binary coding circuit 8 is set at the middle point between the point e and the point f shown in FIG. 8 in the above preferred embodiment, the threshold may be set at any point between the maximum g of pixel values in the cluster 1 and the minimum of pixel values in the cluster 2.

Further, while the typical value in each cluster is set to the average of pixel values in each cluster in the binary coding circuit 8 or the character/background separating circuit 9, the typical value may be set to the middle point in the range of each cluster or the pixel value corresponding to the maximum of the number of pixels in each cluster.

Further, while the threshold for binary coding in the character/background separating circuit 9 is set at the point g or the point h shown in FIG. 9, the threshold may be set at any point between the maximum of pixel values in the cluster 1 and the minimum of pixel values in the cluster 2.

Figure 14:
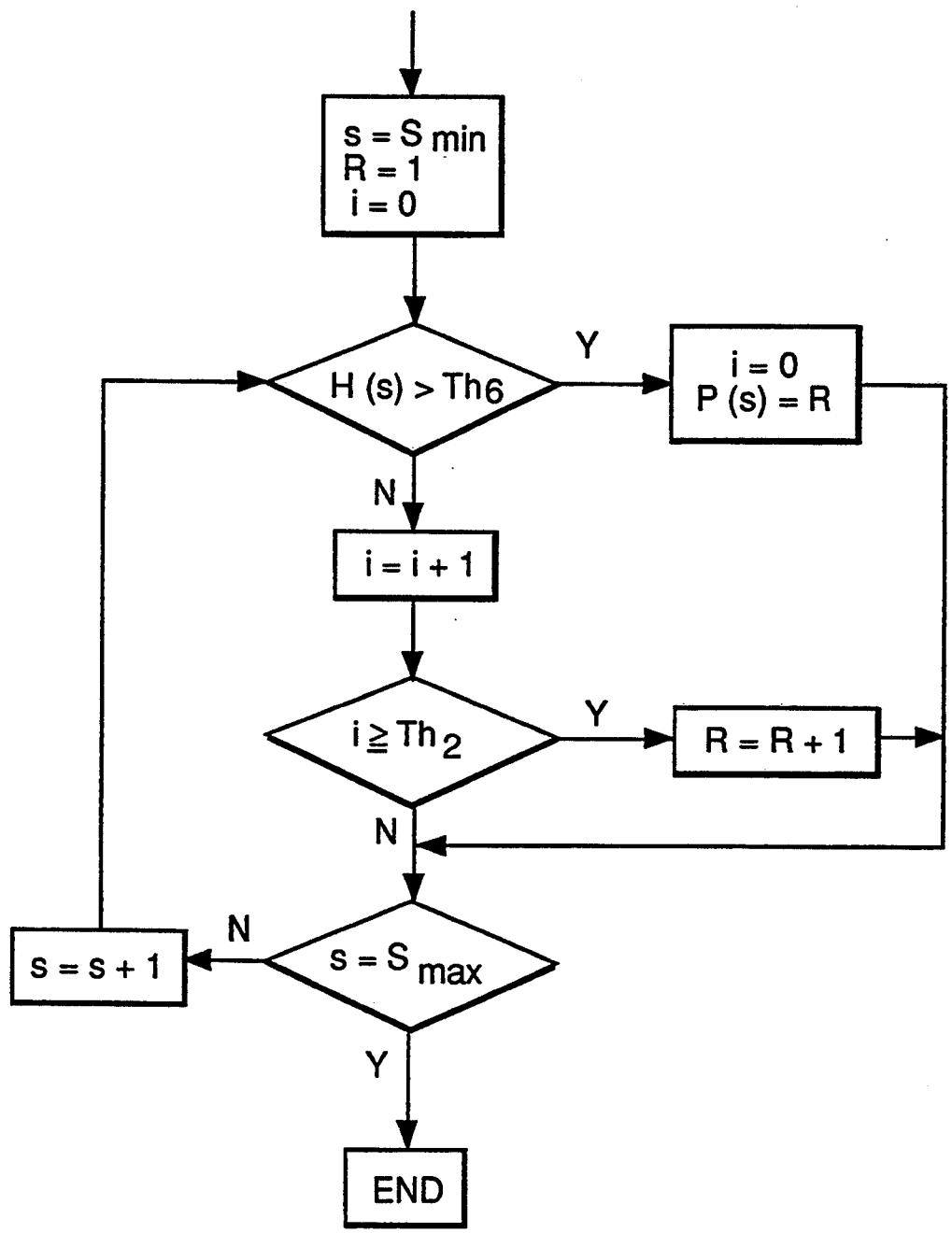
FIG. 14 is a flowchart of the operation of another preferred embodiment of the clustering circuit used in the image coding device shown in FIG. 1.

Further, while the algorithm shown in FIG. 6 is used in the clustering circuit 23 shown in FIG. 2, an algorithm employing a suitable threshold $Th_6$ as shown in FIG. 14 may be used.

Further, while the algorithm shown in FIG. 6 is used in the clustering circuit 23 shown in FIG. 2, a general algorithm for clustering, such as a K average algorithm, may be used.

Further, while the JBIG coding method is used in the binary image coder 10 and the JPEG coding method is used in the nonbinary image coder 11 in the above preferred embodiment, any other binary image coding methods and nonbinary image coding methods may be used in the binary image coder 10 and the nonbinary image coder 11, respectively.

Further, while the cluster information is fed from the coding mode deciding circuit 4 shown in FIG. 1 to the binary coding circuit 8 or the character/background separating circuit 9, the threshold only for binary coding or character/background separation may be fed from the coding mode deciding circuit 4.

Figure 15:
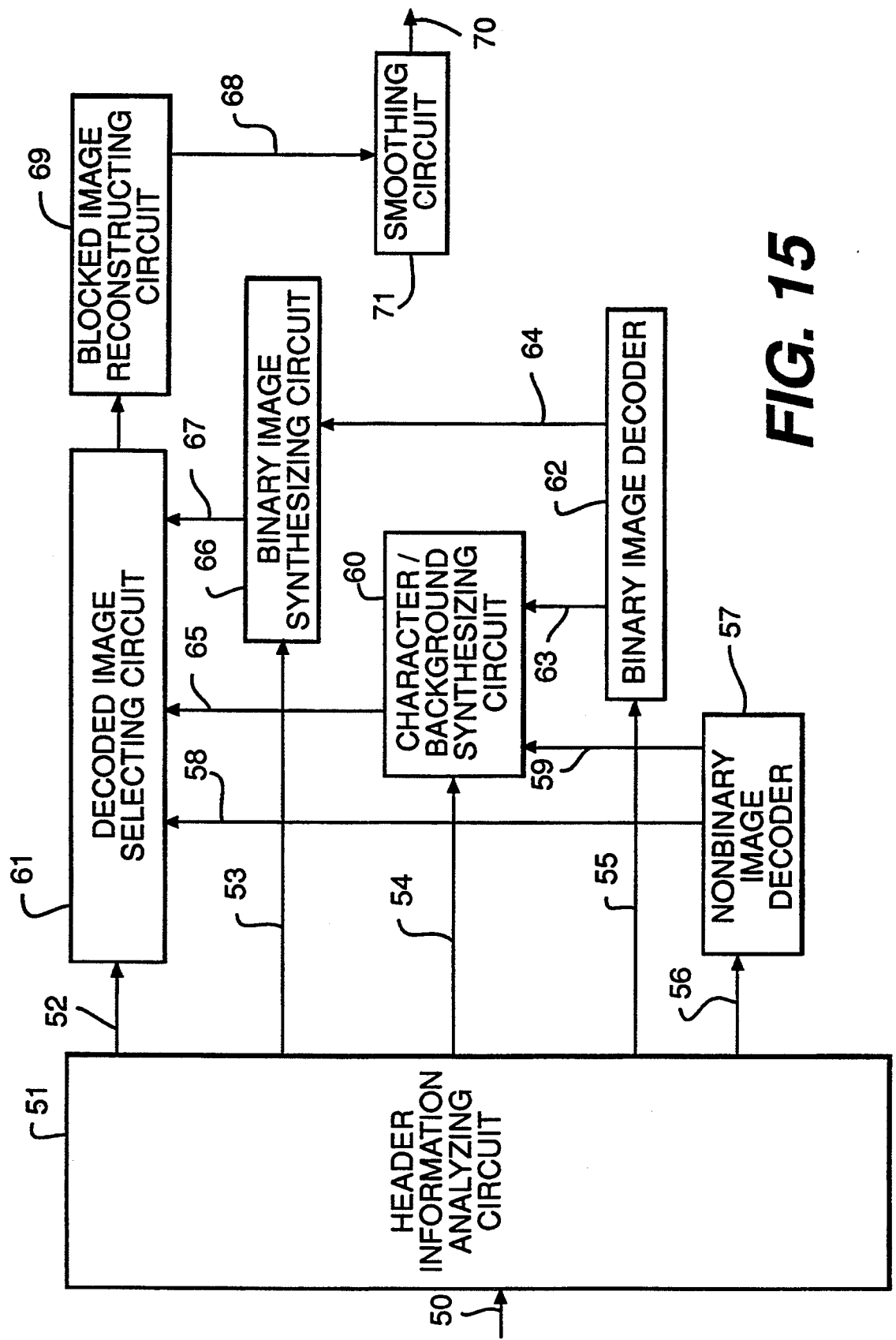
FIG. 15 is a block diagram of another preferred embodiment of the image decoding device for decoding information coded by the image coding device according to the present invention.
Figure 16:
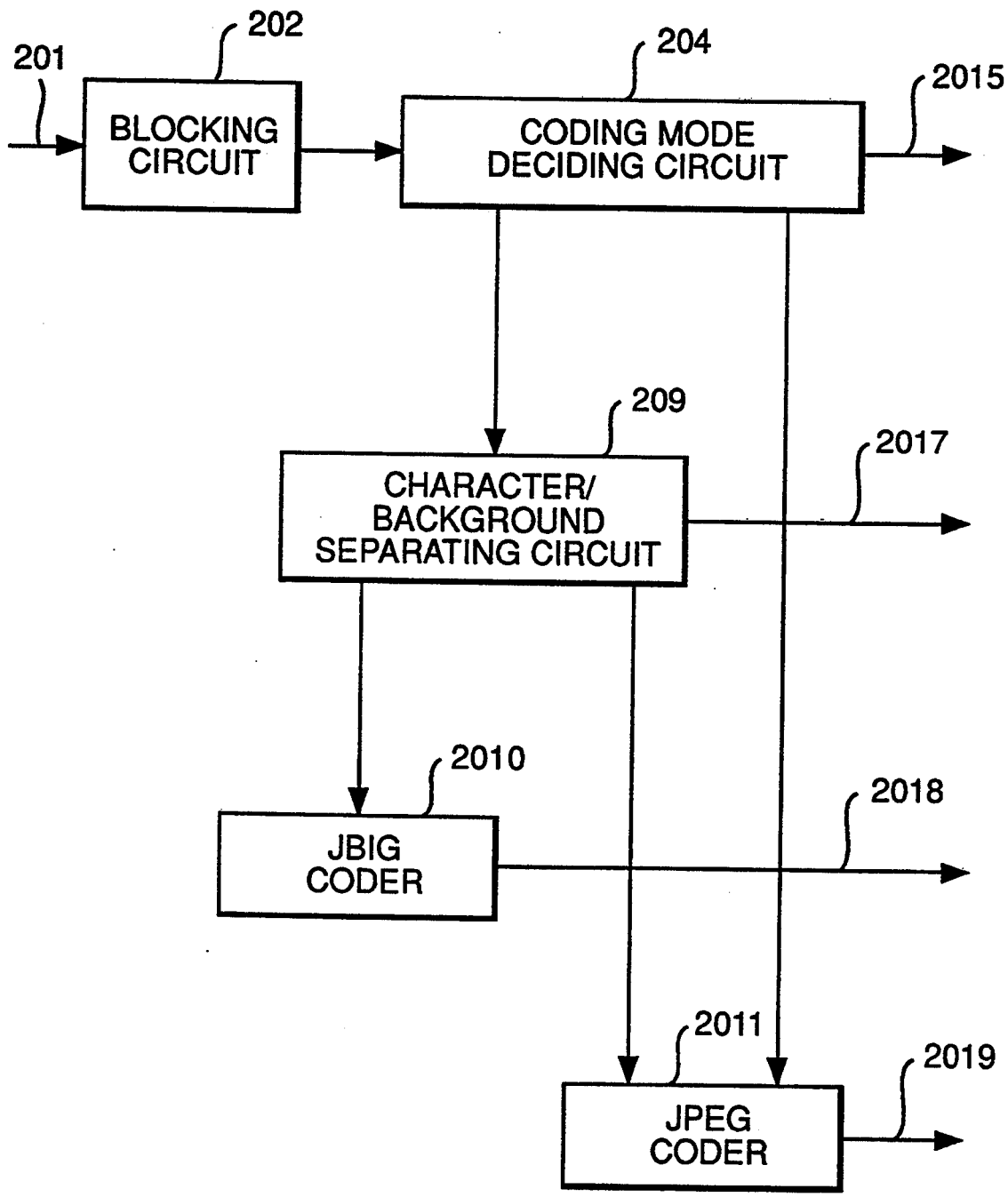
FIG. 16 is a block diagram of an image coding device in the prior art.
Figure 17:
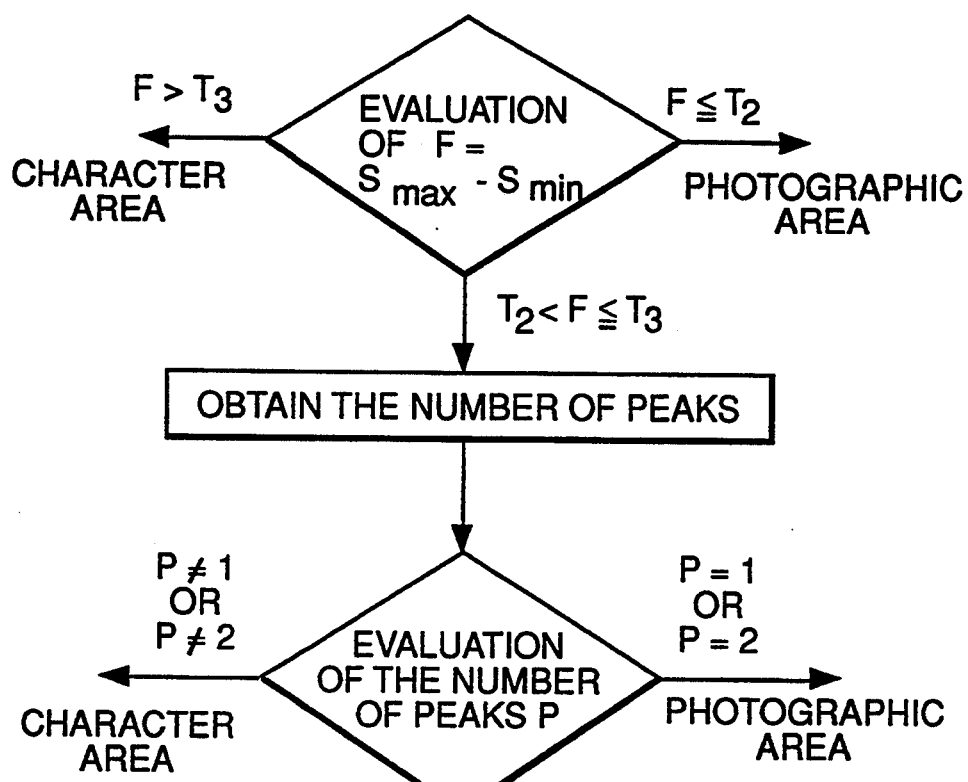
FIG. 17 is a flowchart of the operation of image area decision in a coding mode deciding circuit in the prior art.

Further, as shown in FIG. 15, a smoothing circuit 71 may be added to the final stage in the decoding device mentioned above. The smoothing circuit 71 includes a plurality of filters having suitable frequency characteristics to obtain a decoded image with a desired characteristic. For example, a filter for improving a character quality and a filter for improving a photograph quality are provided, and they are exchanged according to user's selection.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. An image coding device comprising:
    means for inputting an image signal;
    dividing means for dividing said image signal input by said inputting means into a plurality of image areas;
    coding method deciding means for examining pixel values of an image in one of said image areas divided by said dividing means as a target image area and deciding a coding method for said target image area;
    binary image coding means for coding said image in said target image area to obtain a binary image code;
    nonbinary image coding means for coding said image in said target image area to obtain a nonbinary image code;
    image component separating means for separating said image in said target image area into a binary image component and a nonbinary image component and supplying said binary image component and said nonbinary image component to said binary image coding means and said non-binary image coding means, respectively; and
    control means for selectively operating said binary image coding means and said nonbinary image coding means according to a decision result obtained in said coding method deciding means.

2. The image coding device as defined in claim 1, wherein said coding method deciding means examines said pixel values in said target image area and additionally uses an already decided coding method for another image area adjacent to said target image area.

3. The image coding device as defined in claim 1, wherein said coding method deciding means examines said pixel values in said target image area and additionally uses pixel values in another image area containing pixels in proximity to said target image area.

4. The image coding device as defined in claim 1, wherein said coding method deciding means obtains a frequency distribution of said pixel values in said target image area and decides said coding method according to said frequency distribution.

5. The image coding device as defined in claim 1, wherein a threshold in said binary image coding means is decided according to a frequency distribution of said pixel values in said target image area.

6. The image coding device as defined in claim 1, wherein a threshold in said image component separating means is decided according to a frequency distribution of said pixel values in said target image area.

7. The image coding device as defined in claim 1, further comprising means for adding decision information obtained by said coding method deciding means to a coded image signal.

8. An image decoding device for decoding said image signal coded by said image coding device as defined in claim 7, comprising:
    decision information analyzing means for analyzing said decision information;
    binary image decoding means for decoding said binary image code in said coded image signal according to an analysis result obtained by said decision information analyzing means;
    nonbinary image decoding means for decoding said nonbinary image code in said coded image signal according to an analysis result obtained by said decision information analyzing means;
    image synthesizing means for synthesizing an image according to an analysis result obtained by said decision information analyzing means, information from said binary image decoding means, and information from said nonbinary image decoding means; and
    image reconstructing means for reconstructing a decoded image in each of said image areas and outputting a final decoded image.

9. The image decoding device as defined in claim 8, further comprising image smoothing means for smoothing a spatial frequency of said final decoded signal according to a kind of said final decoded image.

* * * * *